(12) United States Patent
Heo et al.

(10) Patent No.: US 11,057,849 B2
(45) Date of Patent: Jul. 6, 2021

(54) ELECTRONIC DEVICE HAVING ANTENNA ARRAY AND POWER BACKOFF CONTROL METHOD FOR THE ELECTRONIC DEVICE

(71) Applicant: Samsung Electronics Co., Ltd., Suwon-si (KR)

(72) Inventors: Wonhyung Heo, Suwon-si (KR); Kyungrok Lee, Suwon-si (KR); Hyeongjoo Oh, Suwon-si (KR); Jungsik Kim, Suwon-si (KR); Yongsang Yun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/793,613

(22) Filed: Feb. 18, 2020

(65) Prior Publication Data

US 2020/0314774 A1 Oct. 1, 2020

(30) Foreign Application Priority Data

Mar. 26, 2019 (KR) .................. 10-2019-0034643

(51) Int. Cl.
*H04W 52/42* (2009.01)

(52) U.S. Cl.
CPC .................. *H04W 52/42* (2013.01)

(58) Field of Classification Search
CPC .... H01Q 19/10; H01Q 1/246; H01Q 21/0006; H01Q 21/0025; H01Q 21/0031; H01Q 21/061; H01Q 21/24; H01Q 25/007; H01Q 3/36; H03F 3/68; H04B 7/024; H04B 7/0404; H04B 7/0408; H04B 7/0413; H04B 7/0426; H04B 7/0695; H04B 7/088; H04B 7/18515; H04N 1/00352; H04N 1/215; H04N 2201/3247; H04N 5/23222;
(Continued)

(56) References Cited

U.S. PATENT DOCUMENTS

| 8,923,218 B2 | 12/2014 | Luo et al. |
| 10,334,454 B2 * | 6/2019 | Orhan ................. H04W 52/42 |
| 10,383,067 B2 | 8/2019 | Lin et al. |

(Continued)

FOREIGN PATENT DOCUMENTS

EP 3 313 129 A1 4/2018

OTHER PUBLICATIONS

VIVO; Correction on the power backoff for the SUL PHR reporting; 3GPP TSG-RAN WG2 Meeting #101; R2-1801991; Feb. 26-Mar. 2, 2018; Athens, Greece.
(Continued)

*Primary Examiner* — Tan H Trinh
(74) *Attorney, Agent, or Firm* — Jefferson IP Law, LLP

(57) ABSTRACT

An electronic device is provided. The electronic device includes an antenna array including a plurality of elements arranged to perform beamforming, wherein a first number corresponds to a total number of the plurality of elements, a processor operatively connected to the antenna array, and a memory, wherein the memory stores instructions that, when executed, cause the processor to identify a second number of the plurality of elements that are performing the beamforming, determine a first backoff value stored based on the second number, and perform a power backoff operation according to the first backoff value.

23 Claims, 14 Drawing Sheets

(58) Field of Classification Search
CPC ... H04N 5/23293; H04N 5/28; H04W 52/146; H04W 52/16; H04W 52/367; H04W 52/42
USPC ............ 455/68, 69, 522, 550.1; 370/328; 324/551; 342/272, 374, 368
See application file for complete search history.

(56) References Cited

U.S. PATENT DOCUMENTS

| | | | | |
|---|---|---|---|---|
| 2007/0149137 | A1* | 6/2007 | Richardson | H04L 27/2602 455/68 |
| 2007/0149238 | A1* | 6/2007 | Das | H04W 52/146 455/522 |
| 2011/0250928 | A1* | 10/2011 | Schlub | H01Q 1/243 455/550.1 |
| 2012/0008563 | A1* | 1/2012 | Johansson | H04W 52/146 370/328 |
| 2012/0062424 | A1* | 3/2012 | Hwang | H04B 7/0602 342/374 |
| 2014/0315592 | A1* | 10/2014 | Schlub | H04B 1/3838 455/522 |
| 2015/0009069 | A1 | 1/2015 | Yun et al. | |
| 2015/0160282 | A1* | 6/2015 | Candela | G01R 31/50 324/551 |
| 2016/0043476 | A1 | 2/2016 | Bi et al. | |
| 2016/0204507 | A1* | 7/2016 | Karjalainen | H04B 7/088 342/372 |
| 2017/0062908 | A1* | 3/2017 | Sanderovich | H01Q 21/065 |
| 2017/0325264 | A1 | 11/2017 | Cherian et al. | |
| 2018/0132192 | A1* | 5/2018 | Yang | H04B 7/0682 |
| 2018/0255518 | A1* | 9/2018 | Nammi | H04W 52/146 |
| 2018/0278318 | A1 | 9/2018 | Chakraborty et al. | |
| 2018/0302905 | A1* | 10/2018 | Fodor | H04L 27/2646 |
| 2018/0331740 | A1* | 11/2018 | Orhan | H04B 17/102 |
| 2019/0027805 | A1 | 1/2019 | Min et al. | |
| 2020/0036425 | A1* | 1/2020 | Ren | H04L 5/0051 |
| 2020/0052387 | A1* | 2/2020 | Son | H01Q 9/0442 |
| 2020/0244501 | A1* | 7/2020 | Shattil | H04L 27/2605 |

OTHER PUBLICATIONS

International Search Report with Written Opinion dated Jun. 11, 2020; International Appln. No. PCT/KR2020/001994.

* cited by examiner

ELECTRONIC DEVICE HAVING ANTENNA ARRAY AND POWER BACKOFF CONTROL METHOD FOR THE ELECTRONIC DEVICE

CROSS-REFERENCE TO RELATED APPLICATION(S)

This application is based on and claims priority under 35 U.S.C. § 119(a) of a Korean patent application number 10-2019-0034643, filed on Mar. 26, 2019, in the Korean Intellectual Property Office, the disclosure of which is incorporated by reference herein its entirety.

BACKGROUND

1. Field

The disclosure relates to an electronic device having an antenna array and communicating with the outside, and a technology for controlling power backoff according to an operation of the antenna array of the electronic device.

2. Description of Related Art

With the development of mobile communication technology, electronic devices having an antenna have been widely used. The electronic device may transmit and/or receive a radio frequency (RF) signal including a speech signal or data (e.g., a message, a photo, a video, a music file, or a game) using an antenna. For example, the electronic device may perform communication using a high frequency (e.g., 5G millimeter wave (mmWave)). The electronic device may transmit and/or receive an RF signal using an antenna assembly or an antenna array.

The above information is presented as background information only to assist with an understanding of the disclosure. No determination has been made, and no assertion is made, as to whether any of the above might be applicable as prior art with regard to the disclosure.

SUMMARY

For wireless communications, there is a need to meet certain regulatory requirements. Electromagnetic waves generated in a wireless communication situation may adversely affect a human body and thus, it is necessary to limit the degree to which the human body is exposed to electromagnetic waves when the human body is proximate to an electronic device that transmits a wireless communication signal. For example, the maximum permissible exposure (MPE) value for electromagnetic waves used in wireless communications is determined by the Federal Communications Commission (FCC). In addition, many countries regulate to meet the criteria for Specific Absorption Rate (SAR), which is an indicator of the absorption rate of electromagnetic waves in the human body.

It is possible to perform power backoff in such a way as to uniformly reduce power for feeding, which is input or transferred to the antenna module to meet the criteria for maximum permissible exposure and/or specific absorption rate for electromagnetic waves radiated from the electronic device.

With the development of wireless communication technology, a portion of an antenna module which radiates an RF signal may be formed as an array including a plurality of elements to use a wireless communication signal of a high frequency band. In the case of using the antenna array, a signal may be transmitted and received through beamforming. When power transferred to the antenna array is uniformly reduced, the radiation performance of the antenna array may be deteriorated. For example, in the case of radiating a signal using only some of elements of an antenna array, it is possible to satisfy the criteria for the maximum permissible exposure and/or a specific absorption rate for electromagnetic waves without performing the power backoff. However, the electronic device may be set to perform power backoff according to a uniformly-set backoff value. In the case of radiating a signal using only some elements, an effective isotropic radiated power (EIRP) may be reduced as the power backoff is performed.

Aspects of the disclosure are to address at least the above-mentioned problems and/or disadvantages and to provide at least the advantages described below. Accordingly, an aspect of the disclosure is to provide an electronic device capable of improving radiation performance of an antenna array by controlling a power backoff value when power backoff is not required because criteria for maximum permissible exposure and/or a specific absorption rate for electromagnetic waves is met or the degree of power backoff is capable of being reduced.

Additional aspects will be set forth in part in the description which follows and, in part, will be apparent from the description, or may be learned by practice of the presented embodiments.

In accordance with an aspect of the disclosure, an electronic device is provided. The electronic device includes an antenna array including a plurality of elements arranged to perform beamforming, wherein a first number corresponds to a total number of the plurality of elements, a processor operatively connected to the antenna array, and a memory, wherein the memory stores instructions that, when executed, cause the processor to identify a second number of the plurality of elements that are performing the beamforming, identify a second number of the plurality of elements that are performing the beamforming, and perform a power backoff operation according to the first backoff value.

In accordance with another aspect of the disclosure, a power backoff control method of an electronic device is provided. The method includes identifying a second number of elements from a plurality of elements in an antenna array that are performing beamforming, wherein a first number corresponds to a total number of the plurality of elements, determining a first backoff value stored based on a feed polarity of the antenna array and the second number, and performing a power backoff operation according to the first backoff value.

In accordance with another aspect of the disclosure, a non-transitory computer-readable storage medium configured to store one or more computer programs including instructions that, when executed by a processor, cause the processor to control to identify a second number of elements from a plurality of elements in an antenna array that are performing beamforming, wherein a first number corresponds to a total number of the plurality of elements, determine a first backoff value based on a feed polarity of the antenna array and the second number, and perform a power backoff operation according to the first backoff value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
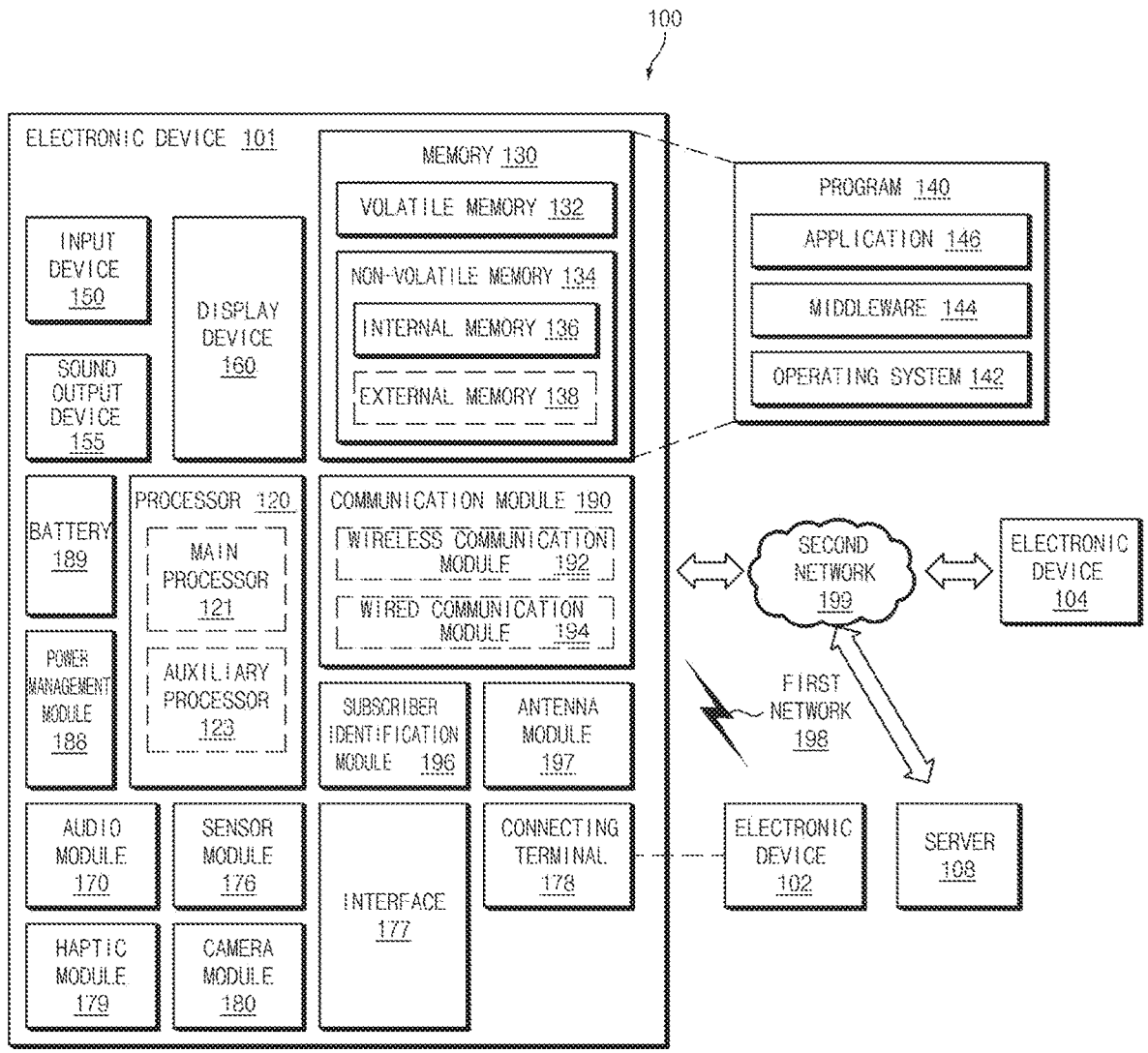
FIG. 1 is a block diagram illustrating an electronic device in a network environment according to an embodiment of the disclosure.

FIG. 1 is a block diagram illustrating an electronic device in a network environment 100 according to an embodiment of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as a single integrated circuit. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate such as a printed circuit board (PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency (RF) integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
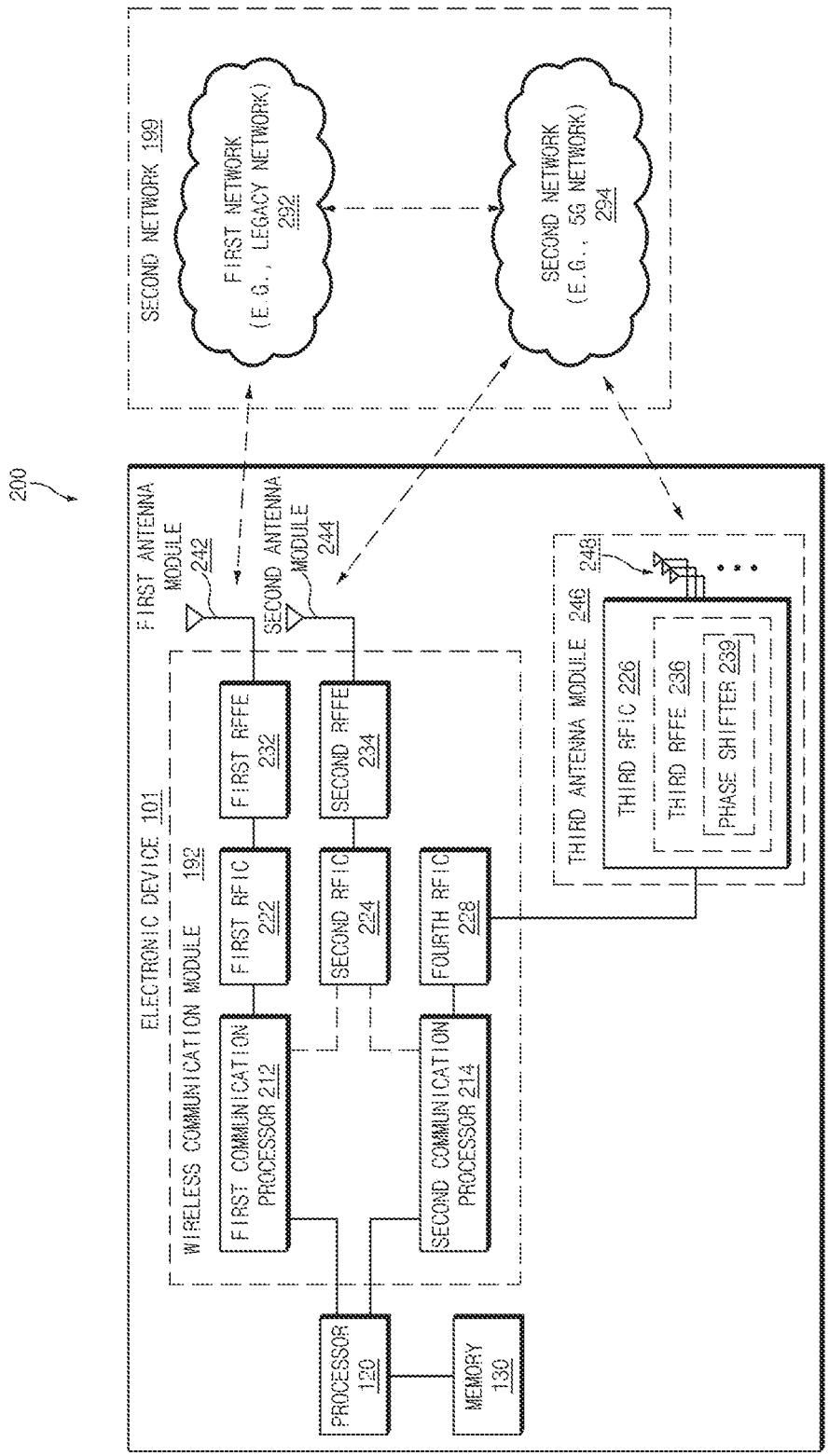
FIG. 2 is a block diagram of an electronic device for supporting legacy network communication and 5G network communication according to an embodiment of the disclosure.

FIG. 2 is a block diagram of an electronic device for supporting legacy network communication and 5G network communication according to an embodiment of the disclosure.

Referring to FIG. 2, a block diagram 100 of the electronic device 101 is illustrated. The electronic device 101 may include a first communication processor 212, a second communication processor 214, a first RFIC 222, a second RFIC 224, and a third RFIC 226, a fourth RFIC 228, a first RF front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one of the components shown in FIG. 1, and the network 199 may further include at least one additional network. According to one embodiment, the first communication processor 212, the second communication processor 214, the first RFIC 222, the second RFIC 224, the fourth RFIC 228, the first RFFE 232, and the second RFFE 234 may constitute at least a part of the wireless communication module 192. According to another embodiment, the fourth RFIC 228 may be omitted or included as a part of the third RFIC 226.

The first communication processor 212 may support the establishment of a communication channel of a band to be used for wireless communication with the first network 292, and legacy network communication through the established communication channel. According to various embodiments, the first network may be a legacy network including a 2G, 3G, 4G, or long term evolution (LTE) network. The second communication processor 214 may establish a communication channel corresponding to a designated band (e.g., 6 GHz to about 60 GHz) of bands to be used for wireless communication with the second network 294, and support 5G network communication through the established communication channel According to various embodiments, the second network 294 may be a 5G network defined in 3GPP. Additionally, according to one embodiment, the first communication processor 212 or the second communication processor 214 may establish a communication channel corresponding to another designated band (e.g., 6 GHz or less) of bands to be used for wireless communication with the second network 294 and support 5G network communication through the established communication channel According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

The first RFIC 222 may convert a baseband signal generated by the first communication processor 212 into a RF signal of about 700 MHz to about 3 GHz used in the first network 292 (e.g., legacy network) in the case of transmission. In the case of reception, the RF signal may be obtained from the first network 292 (e.g., legacy network) via an antenna (e.g., the first antenna module 242), and be preprocessed through an RFFE (e.g., the first RFFE 232). The first RFIC 222 may convert the preprocessed RF signal into a baseband signal to be processed by the first communication processor 212.

The second RFIC 224 may convert the baseband signal generated by the first communication processor 212 or the second communication processor 214 into an RF signal (hereinafter, referred to as a 5G Sub6 RF signal) of the Sub6 band (e.g., about 6 GHz or less) used for the second network 294 (e.g., 5G network) in the case of transmission. In the case of reception, the 5G Sub6 RF signal may be obtained from the second network 294 (e.g., 5G network) via an antenna (e.g., the second antenna module 244), and be preprocessed through an RFFE (e.g., the second RFFE 234). The second RFIC 224 may convert the preprocessed 5G Sub6 RF signal into a baseband signal so as to be processing by a corresponding communication processor of the first communication processor 212 or the second communication processor 214.

The third RFIC 226 may convert the baseband signal generated by the second communication processor 214 into an RF signal (hereinafter, referred to as a 5G Above6 RF signal) of a 5G Above6 band (e.g., about 6 GHz to about 60 GHz) to be used for the second network 294 (e.g., 5G network). In the case of reception, the 5G Above6 RF signal may be obtained from the second network 294 (e.g., 5G network) via an antenna (e.g., the antenna 248) and preprocessed through a third RFFE 236. The third RFFE may include a phase shifter 239 for shifting the phase of various signals. The third RFIC 226 may convert the preprocessed 5G Above6 RF signal into a baseband signal to be processed by the second communication processor 214. According to one embodiment, the third RFFE 236 may be formed as a part of the third RFIC 226.

According to one embodiment, the electronic device 101 may include the fourth RFIC 228 separately from or at least as a part of the third RFIC 226. In this case, the fourth RFIC 228 may convert the baseband signal generated by the second communication processor 214 into an intermediate RF (IF) signal in an intermediate frequency band (e.g., about 9 GHz to about 11 GHz) and transmit the IF signal to the third RFIC 226. The third RFIC 226 may convert the IF signal into the 5G Above6 RF signal. In the case of reception, the 5G Above6 RF signal may be received from the second network 294 (e.g., 5G network) via an antenna (e.g., the antenna 248) and may be converted into an IF signal by the third RFIC 226. The fourth RFIC 228 may convert the IF signal into a baseband signal so as to be processed by the second communication processor 214.

According to one embodiment, the first RFIC 222 and the second RFIC 224 may be implemented as a single chip or at least a part of a single package. According to one embodiment, the first RFFE 232 and the second RFFE 234 may be implemented as a single chip or at least a part of a single package. According to one embodiment, at least one of the first antenna module 242 or the second antenna module 244 may be omitted or combined with another antenna module to process RF signals of a corresponding plurality of bands.

According to one embodiment, the third RFIC 226 and the antenna 248 may be disposed on the same substrate to form a third antenna module 246. For example, the wireless communication module 192 or the processor 120 may be disposed on a first substrate (e.g., main PCB). In this case, the third RFIC 226 may be disposed in a partial area (e.g., bottom) of a second substrate (e.g., sub PCB), which is separate from the first substrate, and the antenna 248 may be disposed in another partial area (e.g., top), thereby forming the third antenna module 246. According to one embodiment, the antenna 248 may include an antenna array that may be used, for example, for beamforming By placing the third RFIC 226 and the antenna 248 on the same substrate, it is possible to reduce the length of a transmission line therebetween. This may reduce, for example, the loss (e.g., attenuation) of signals in a high frequency band (e.g., about 6 GHz to about 60 GHz) used for 5G network communications which is caused due to a transmission line. For this reason, the electronic device 101 may improve the quality or speed of communication with the second network 294 (e.g., 5G network).

The second network 294 (e.g., 5G network) may be operated independently of the first network 292 (e.g., legacy network) (e.g., Stand-Alone (SA)) or may be operated in conjunction with the first network 292 (e.g., Non-Stand Alone (NSA). For example, the 5G network may have only an access network (e.g., 5G radio access network (RAN) or next generation RAN (NG RAN)), but no core network (e.g., next generation core (NGC)). In this case, the electronic device 101 may access an external network (e.g., the Internet) under the control of a core network (e.g., an evolved packed core (EPC)) of the legacy network after accessing an access network of the 5G network. Protocol information (e.g., LTE protocol information) for communication with the legacy network or protocol information (e.g., New Radio (NR) protocol information) for communication with the 5G network may be stored in the memory 130 and be accessed by another component (e.g., the processor 120, the first communication processor 212, or the second communication processor 214).

Figure 3A:
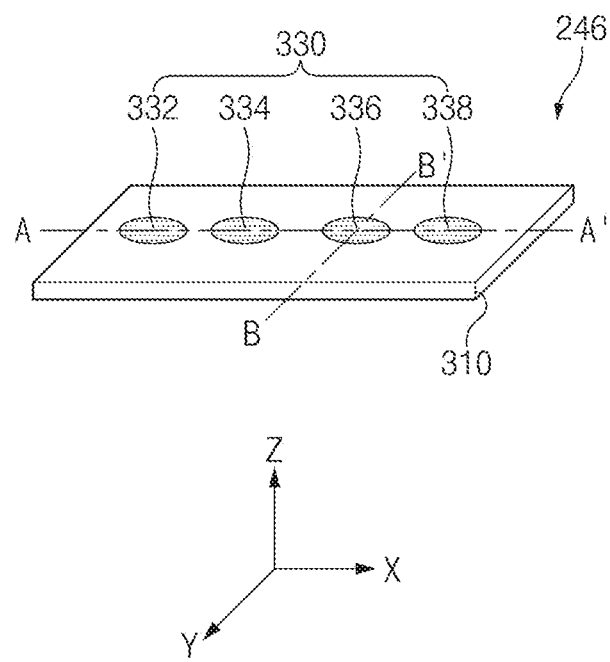
FIG. 3A is a perspective view of an antenna module viewed from one side according to an embodiment of the disclosure.
Figure 3B:
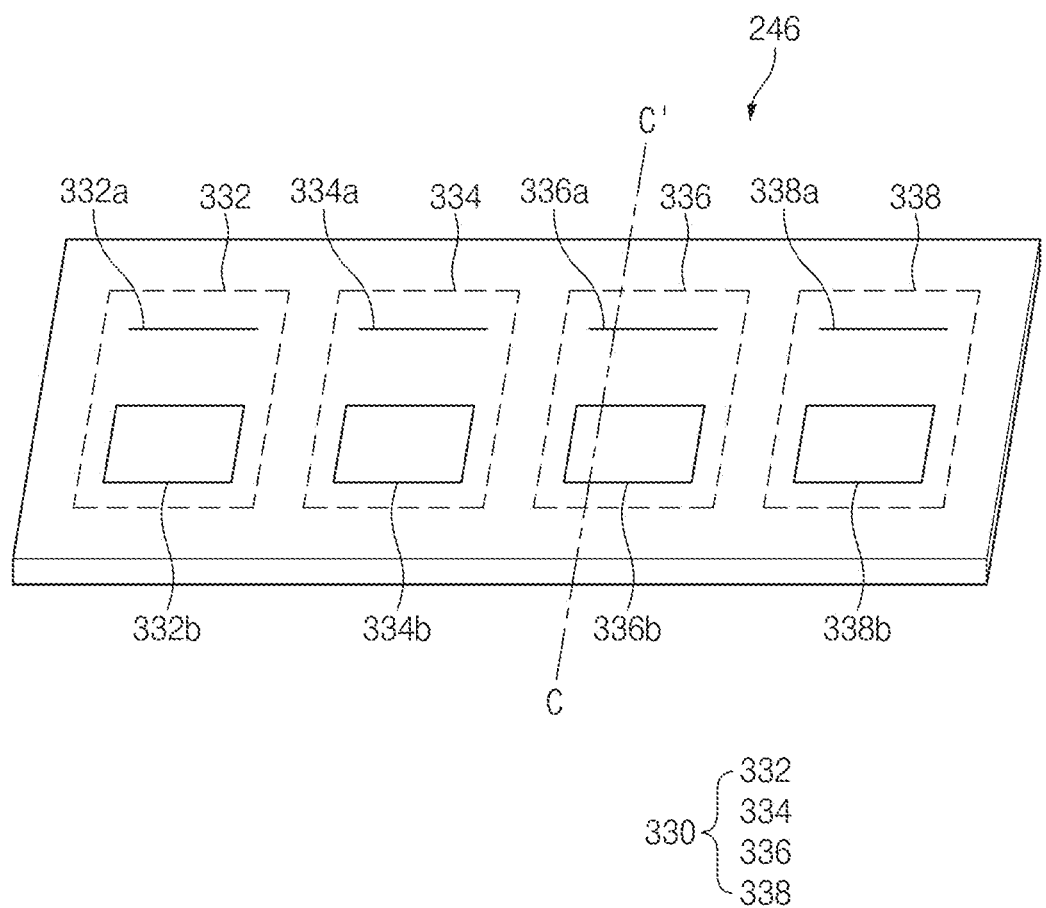
FIG. 3B is a perspective view of an antenna module of FIG. 3A viewed from one side according to an embodiment of the disclosure.
Figure 3C:
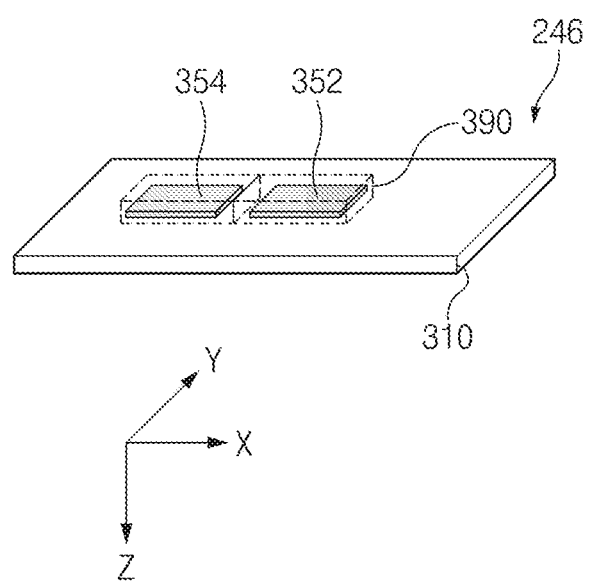
FIG. 3C is a perspective view of an antenna module viewed from another side according to an embodiment of the disclosure.
Figure 3D:
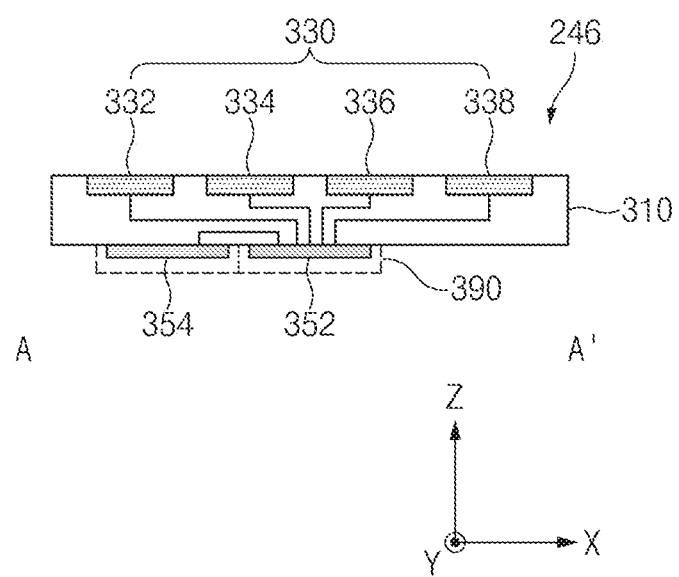
FIG. 3D is a cross-sectional view taken along line A-A' of the antenna module of FIG. 3A according to an embodiment of the disclosure.

FIG. 3A is a perspective view of an antenna module viewed from one side according to an embodiment of the disclosure, FIG. 3B is a perspective view of an antenna module of FIG. 3A viewed from one side according to an embodiment of the disclosure, and FIG. 3C is a perspective view of an antenna module viewed from another side according to an embodiment of the disclosure. FIG. 3D is a cross-sectional view taken along line A-A' of the antenna module of FIG. 3A according to an embodiment of the disclosure.

Referring to FIGS. 3A, 3B, 3C, and 3D, an antenna module 246 may include a printed circuit board 310, an antenna array 330, a RFIC 352, and a PMIC 354, and a module interface. Optionally, the third antenna module 246 may further include a shield member 390. In other embodiments, at least one of the components mentioned above may be omitted, or at least two of the components may be integrally formed.

The printed circuit board 310 may include a plurality of conductive layers and a plurality of non-conductive layers stacked alternately with the conductive layers. The printed circuit board 310 may provide electrical connections between the printed circuit board 310 and/or various electronic components disposed outside by using wires and conductive vias formed in the conductive layer.

The antenna array 330 (e.g., 248 of FIG. 2) may include a plurality of antenna elements 332, 334, 336, or 338 arranged to form a directional beam. The antenna elements may be formed on a first surface of the printed circuit board 310 as shown. According to another embodiment, the antenna array 330 may be formed in the printed circuit board 310. According to embodiments, the antenna array 330 may include a plurality of antenna arrays (e.g., a dipole antenna array, and/or a patch antenna array) of the same shape or type or different shapes or types.

The RFIC 352 (e.g., 226 of FIG. 2) may be arranged in another area of the printed circuit board 310 (e.g., the second surface opposite to the first surface), spaced apart from the antenna array. The RFIC is configured to process a signal of a selected frequency band transmitted/received through the antenna array 330. According to one embodiment, the RFIC 352 may, upon transmission, convert a baseband signal obtained from a communication processor (not shown) into an RF signal of a specified band. The RFIC 352 may convert the RF signal received through the antenna array 330 into a baseband signal and transmit the received RF signal to the communication processor upon reception.

According to another embodiment, the RFIC 352 may, upon transmission, up-convert an IF signal (e.g., about 9 GHz to about 11 GHz) obtained from an intermediate frequency integrate circuit (IFIC) (e.g., 228 of FIG. 2) into an RF signal of a selected band. Upon reception, the RFIC 352 may down-convert the RF signal obtained through the antenna array 330, convert the RF signal into an IF signal, and transfer the IF signal to the IFIC.

The PMIC 354 may be arranged in another partial area of the printed circuit board 310 (e.g., the second surface), spaced apart from the antenna array. The PMIC may receive a voltage from a main PCB (not shown) and provide power required for various components (e.g., RFIC 352) on the antenna module.

The shield member 390 may be disposed on a portion (e.g., the second surface) of the printed circuit board 310 to electromagnetically shield at least one of the RFIC 352 or the PMIC 354. According to one embodiment, the shield member 390 may include a shield can.

According to various embodiments, the antenna array 330 (e.g., 248 of FIG. 2) may include a plurality of antenna elements 332, 334, 336, or 338 arranged to form a directional beam. The antenna array 330 may transmit and/or receive an RF signal with another external electronic device through beamforming. It is possible to set a feed polarity that is a polarization direction of the signal based on the direction and the intensity of a signal radiated through the antenna array 330. The feed polarity may be for generating a horizontally polarized electric field and/or a vertically polarized electric field, that is, an electric field formed in one direction or two different directions. For example, the RFIC 352 may feed the antenna array 330 including at least one antenna element with a single horizontal polarization (H-pol), feed the antenna array 330 including at least one antenna element with a single vertical polarization (V-pol), or feed the antenna array 330 including at least one antenna element with horizontal-vertical dual polarization.

According to various embodiments, each antenna element 332, 334, 336, or 338 may include a first antenna element 332a, 334a, 336a, or 338a (e.g., a dipole antenna or a first polarity antenna) and a second antenna element 332b, 334b, 336b, or 338b (e.g., a patch antenna or a second polarity antenna).

According to various embodiments, the processor 120 may set the form of a beam radiated from the antenna array 330 according to a communication environment. The processor 120 may set a feed polarity that is a direction in which the RFIC 226, disposed in the antenna array 330, feeds the antenna array 330 and/or the polarization direction of a feed signal to set the form of a beam radiated from the antenna array 330. For example, a modem 501 may feed the first antenna element 332a, 334a, 336a, or 338a with single H-pol, feed the second antenna element 332b, 334b, 336b, or 338b with single V-pol, or feed the first antenna element 332a, 334a, 336a, or 338a and the second antenna element 332b, 334b, 336b, or 338b with horizontal-vertical dual polarization in the RFIC 226.

According to various embodiments, the processor 120 may perform power backoff for a beam radiated from the antenna array 330. The processor 120 may perform a power backoff event based on the number of antenna elements performing beamforming. The processor 120 may perform a power backoff event for each of first antenna elements or second antenna elements.

According to various embodiments, the processor 120 may perform power backoff for a beam radiated from the antenna array 330. The processor 120 may perform a power backoff event based on whether the first antenna element 332a, 334a, 336a, or 338a that outputs a single H-pol and the second antenna elements 332b, 334b, 336b, or 338b that outputs a single V-pol operate, and the number of first antenna elements and/or second antenna elements. The processor 120 may perform a power backoff event based on the number of first antenna elements or second antenna elements. Although not shown, in various embodiments, the third antenna module 246 may be electrically connected to another printed circuit board (e.g., a main circuit board) through a module interface. The module interface may include a connecting member, for example, a coaxial cable connector, a board to board connector, an interposer, or a flexible printed circuit board (FPCB). The RFIC 352 and/or the PMIC 354 of the antenna module may be electrically connected to the printed circuit board through the connecting member.

Figure 4A:
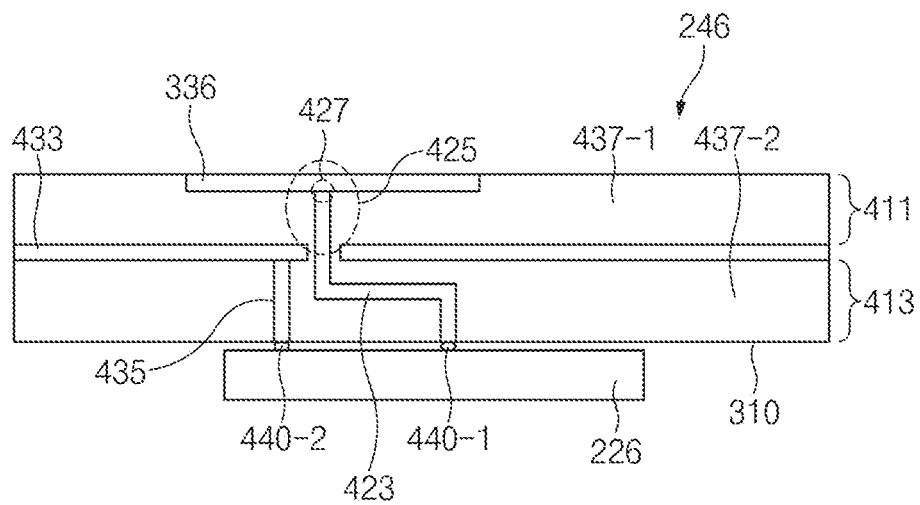
FIG. 4A is a cross section taken along line B-B' of the antenna module of FIG. 3A according to an embodiment of the disclosure.
Figure 4B:
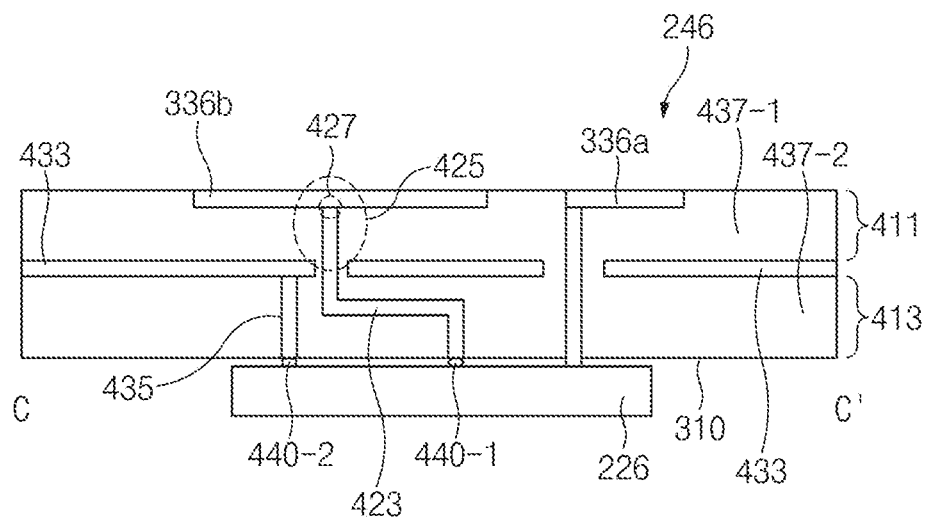
FIGS. 4B and 4C are cross-sections taken along line C-C' of the antenna module of FIG. 3B according to various embodiments of the disclosure.
Figure 4C:
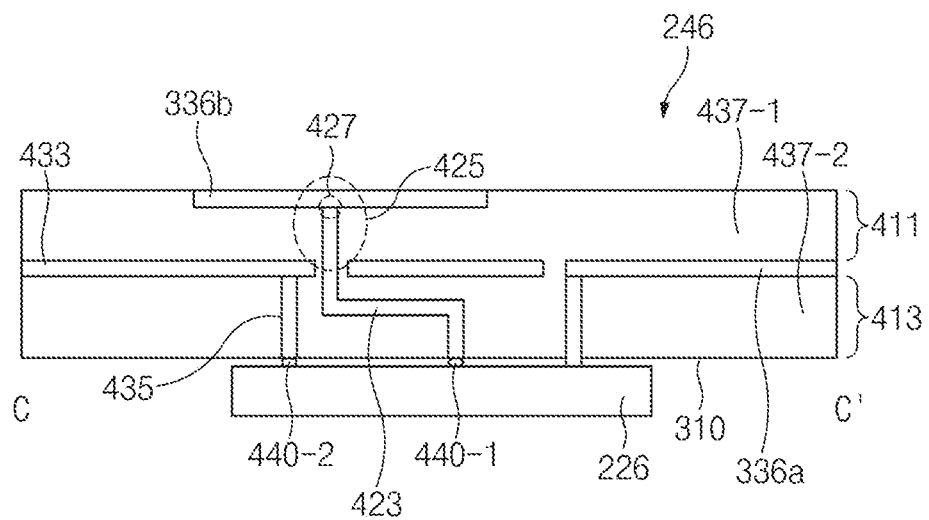

FIG. 4A is a cross-sectional view taken along line B-B' of the antenna module of FIG. 3A according to an embodiment of the disclosure. FIGS. 4B and 4C are cross-sections taken along line C-C' of the antenna module of FIG. 3B according to various embodiments of the disclosure.

Referring to FIGS. 4A, 4B, and 4C, the printed circuit board 310 of the illustrated embodiments may include an antenna layer 411 and a network layer 413. The antenna layer 411 may include at least one dielectric layer 437-1 and the antenna element 336 and/or a feeder 425 formed on or in an outer surface of the dielectric layer. The feeder 425 may include a feed point 427 and/or a portion 423 of a transmission line.

Referring to FIG. 4A, the antenna element 336 may be formed as a patch antenna formed on a surface of the at least one dielectric layer 437-1. In another embodiment, as shown in FIGS. 4B and 4C, a first antenna element 336a may be formed as a dipole antenna, and a second antenna element 336b may be formed as a patch antenna. When the printed circuit board 310 includes a plurality of layers, a pattern may be formed between layers in the printed circuit board 310 to form the first antenna element 336a or the second antenna element 336b. For example, the first antenna element 336a may be formed on the surface of one dielectric layer 437-1 as shown in FIG. 4B, or may be disposed between the two dielectric layers 437-1 and 437-2 as shown in FIG. 4C.

The network layer 413 may include at least one dielectric layer 437-2, at least one ground layer 433 formed on or in an outer surface of the dielectric layer, at least one conductive via 435 and/or a transmission line 423.

In addition, in the illustrated embodiment, the third RFIC 226 may be electrically connected to the network layer 413 through, for example, first and second connections (e.g., solder bumps) 440-1 and 440-2. In other embodiments, various connection structures (e.g., solder or ball grid array (BGA)) may be used instead of the connections. The third RFIC 226 may be electrically connected to the antenna element 336 through the first connection 440-1, the transmission line 423, and the feeder 425. The third RFIC 226 may also be electrically connected to the ground layer 433 through the second connection 440-2 and the conductive via 435.

Figure 5:
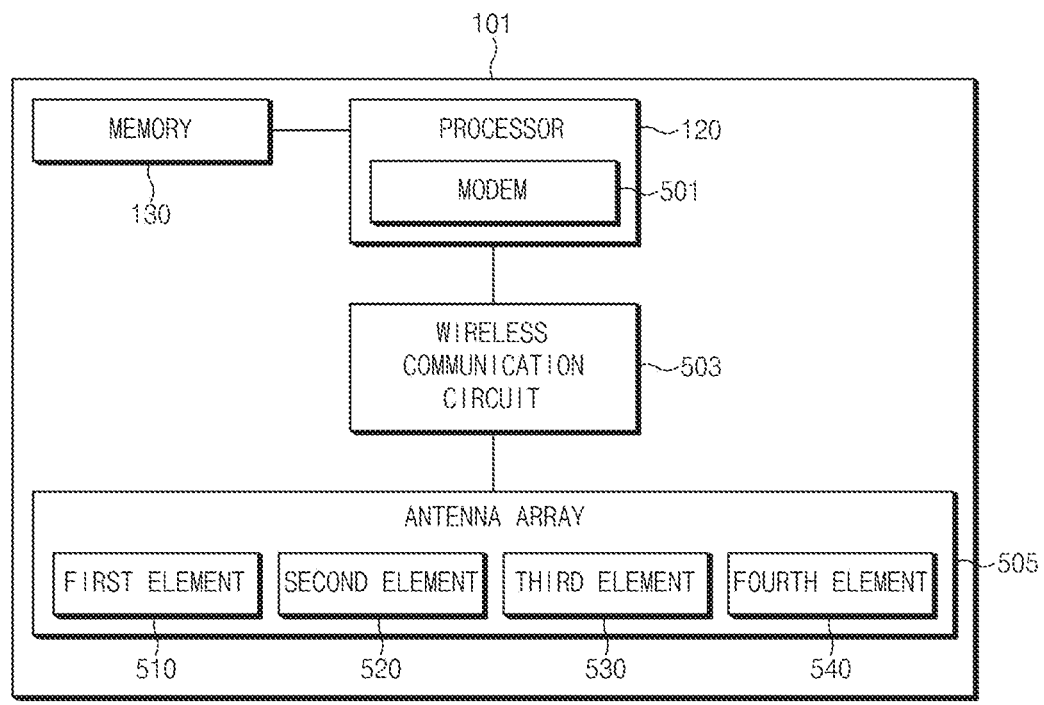
FIG. 5 is a block diagram of an electronic device according to an embodiment of the disclosure.

FIG. 5 is a block diagram of an electronic device according to an embodiment of the disclosure.

Referring to FIG. 5, a block diagram 500 of an electronic device 101 is illustrated. In one embodiment, the processor 120 may be operationally connected to the memory 130. The memory 130 may store instructions necessary for the operation of the processor 120. The processor 120 may include a communication processor (CP) (e.g., the second communication processor 214 of FIG. 2) supporting 5G mmWave communication.

In one embodiment, the processor 120 may control the operation of the antenna array 505. For example, the processor 120 may perform beamforming to control the intensity, direction, and/or radiation form of a beam formed by signals radiated from the antenna array 505. As another example, the processor 120 may control the intensity, frequency band, and/or phase of a RF signal transmitted and/or received by the antenna array 505.

In one embodiment, the processor 120 may include the modem 501. The modem 501 may support 5G mmWave communication. The modem 501 may be connected to an RFIC (e.g., the third RFIC 226 of FIG. 2) connected to the antenna array 505. The modem 501 may convert an in-phase/quadrature (I/Q) digital signal into an analog signal and transmit the analog signal to the RFIC 226 of the antenna array 505. The modem 501 may convert a signal received by the antenna array 505 into a digital signal and transmit the digital signal to the processor 120.

In one embodiment, the antenna array 505 may transmit and/or receive RF signals. The antenna array 505 may transmit and/or receive an RF signal through beamforming. The antenna array 505 may include first to fourth elements 510, 520, 530, and 540. With the development of wireless communication technology, a portion of the antenna array 505 that radiates an RF signal may be formed of the first to fourth elements 510, 520, 530, and 540 to use a wireless communication signal of a high frequency band. The first to fourth elements 510, 520, 530, and 540 may be patch or dipole antennas.

In one embodiment, the modem 501 may set a form of a beam radiated from the antenna array 505 according to the communication environment. The modem 501 may set a feed polarity, which is a direction in which the RFIC 226, disposed in the antenna array 505, feeds the antenna array 505 and/or the polarization direction of a feed signal, to set the form of a beam radiated from the antenna array 505. For example, the modem 501 may feed the antenna array 505 with a single H-pol, feed the antenna array 505 with a single V-pol or feed the antenna array 505 with horizontal-vertical dual polarization through a signal from the RFIC 226. In the case of feeding with horizontal-vertical dual polarization, the effective isotropic radiated power (EIRP) may increase by about 3 dB. For example, the EIRP may increase by about 3 dB in the case of a multiple input multiple output (MIMO) state using the first antenna element 332a, 33a, 336a, or 338a and the second antenna element 332b, 334b, 336b, or 338b to form an electric field including a first polarity and a second polarity as shown in FIG. 3B, compared with the case of a single input single output (SISO) state using the antenna element 332, 334, 336, or 338 to form an electric field (E-field) including one polarity as shown in FIG. 3A.

In one embodiment, the modem 501 may determine whether a power backoff operation event occurs. The power backoff operation reduces a gain value of a signal transmitted by the antenna array 505. The modem 501 may determine the backoff operation event in various ways. For example, the modem 501 may receive information related to a human body proximity state as in a state in which a user grips the electronic device 101, from a sensor module (e.g., the sensor module 176 of FIG. 1) including a proximity sensor. As another example, the modem 501 may detect a communication environment such as a call state from a wireless communication circuit 503 and receive information related to a communication state. The modem 501 may generate a backoff operation event to satisfy the criteria for a specific absorption rate (SAR) indicating an electromagnetic absorption rate of the human body measured in the outside of the electronic device 101 based on the information related to the human body proximity state and/or information related to the communication state. Information about the power backoff amount or the output set power may be stored in the memory 130 based on the experimental numerical information related to the specific absorption rate. The modem 501 may perform a power backoff operation on the antenna array 505 when a backoff operation event occurs.

In one embodiment, the memory 130 may store a backoff table. The backoff table may define a backoff operation to be performed corresponding to the backoff operation event when the backoff operation event occurs. For example, the backoff table may include an amount of reduction in the intensity of a signal transferred to each of the first to fourth elements 510, 520, 530, and 540 included in the antenna array 505 in response to the backoff operation event.

In one embodiment, the modem 501 may identify the number of elements that perform an operation of transmitting and/or receiving a signal in the antenna array 505. For example, the modem 501 may determine to which of the first to fourth elements 510, 520, 530, and 540 of the antenna array 505, the intensity of a beam, the form of a beam, and/or a supplied current is input and identify the number of elements performing an operation of transmitting and/or receiving a signal. At least some of the antenna elements of the plurality of antenna elements may be used to transmit and/or receive a signal. For example, the number of elements to be used for transmitting and receiving signals may be classified into a first number in which all elements operate, a second number in half of the first number, and/or a third number in which minimum elements operate. For example, when the antenna array 505 includes the first to fourth elements 510, 520, 530, and 540, the first number may be four, the second number may be two, and the third number may be one. The number of elements and classification levels are exemplary, and embodiments of the disclosure are not limited thereto.

Figure 6:
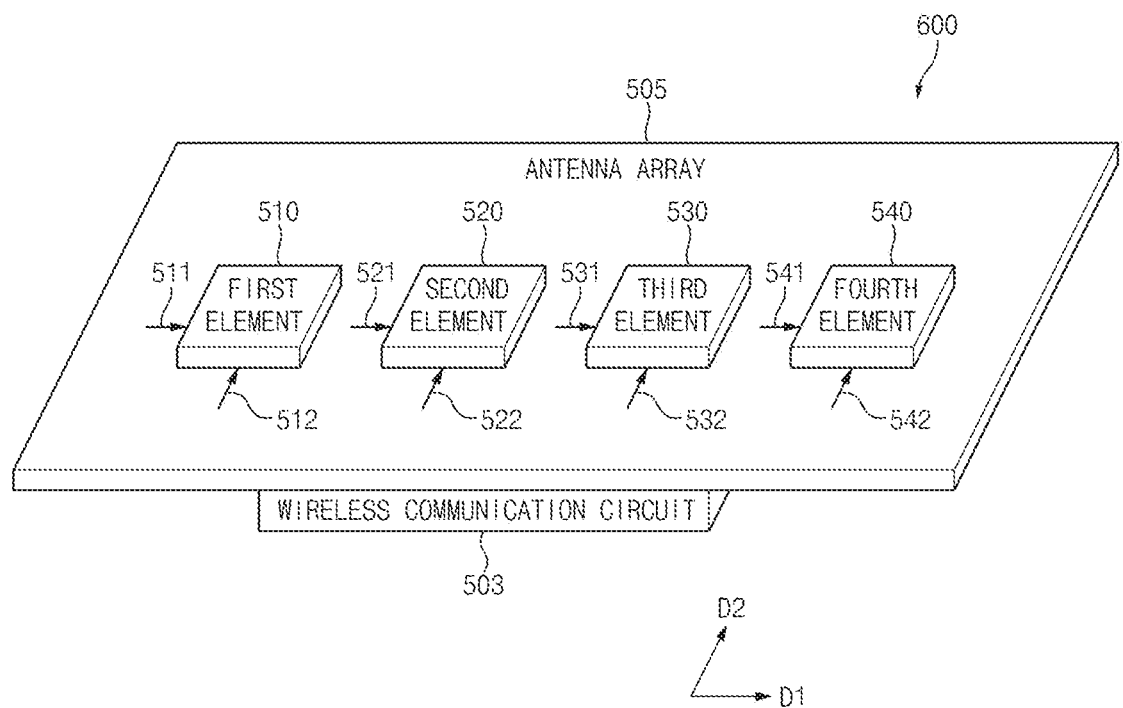
FIG. 6 is a diagram illustrating first to fourth elements of an antenna array according to an embodiment of the disclosure.

FIG. 6 is a diagram illustrating first to fourth elements of an antenna array according to an embodiment of the disclosure.

Referring to FIG. 6, a diagram 600 illustrates that an antenna array 505 may have first and second surfaces opposing each other. The first to fourth elements 510, 520, 530, and 540 may be disposed on and/or in the first surface of the antenna array 505. The wireless communication circuit 503 may be disposed on the second surface of the antenna array 505.

In one embodiment, the wireless communication circuit 503 may perform substantially the same function as the third RFIC 226 of FIG. 2. The wireless communication circuit 503 may be connected to the modem 501 included in the second communication processor 214 via an IFIC. The wireless communication circuit 503 may receive an IF signal from the modem 501 and convert the IF signal into an RF signal. The wireless communication circuit 503 may feed the first to fourth elements 510, 520, 530, and 540 through RF signals.

In one embodiment, the wireless communication circuit 503 may feed the first to fourth elements 510, 520, 530, and 540 through signals 511, 512, 521, 522, 531, 532, 541 or 542 that are polarized in a specified direction. For example, as illustrated in FIG. 6, one element 510 may be fed through the signals 511 and 512, which are polarized in different directions. As another example, as illustrated in FIG. 3B, the first antenna element 332a, 334a, 336a, or 338a that generates a signal polarized in a first direction D1 and the second antenna element 332b, 334b, 336b, or 338b that generates a signal polarized in a second direction D2 may be configured separately. The specified direction may include the first direction D1 and/or the second direction D2. For example, the signal 511, 521, 531, or 541 polarized in the first direction D1 may be an H-pol signal polarized in a horizontal direction, and the signal 512, 522, 532, or 542 polarized in the second direction D2 may be a V-pol signal polarized in a vertical direction.

In one embodiment, each of the first to fourth elements 510, 520, 530, and 540 may receive the H-pol signal polarized horizontally in the first direction D1, may receive the V-pol signal polarized vertically in the first direction D1, or may receive horizontal-vertical dual polarized signals in the first direction D1 and the second direction D2. For example, the first element 510 may receive at least one of a first signal 511 and a second signal 512. In the same manner, the second element 520 may receive at least one of a third signal 521 and a fourth signal 522. In the same manner, the third element 530 may receive at least one of a fifth signal 531 and a sixth signal 532. In the same manner, the fourth element 540 may receive at least one of a seventh signal 541 and an eighth signal 542.

Figure 7A:
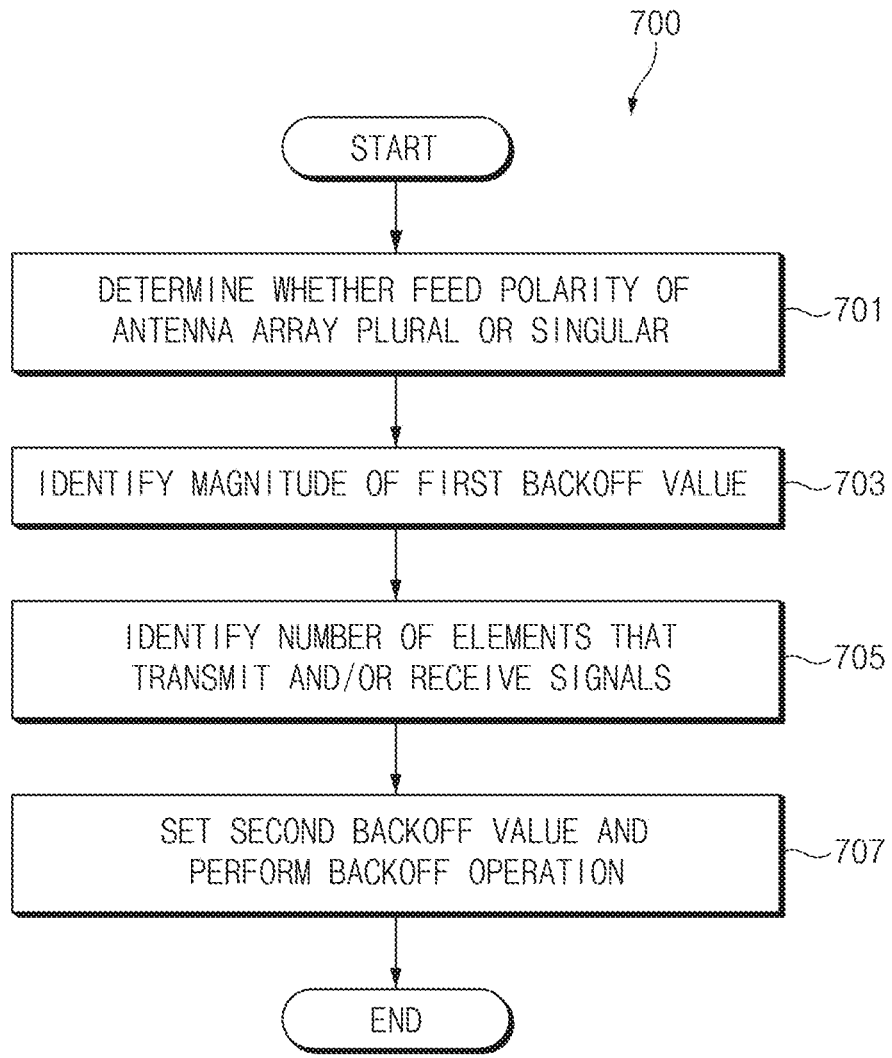
FIG. 7A is a flowchart illustrating a power backoff control method of an electronic device according to an embodiment of the disclosure.

FIG. 7A is a flowchart illustrating a power backoff control method of an electronic device according to an embodiment of the disclosure.

Referring to FIG. 7A, a flowchart 700 of a power backoff method is illustrated. In operation 701, the electronic device 101 according to an embodiment may determine whether a feed polarity of an antenna array is singular or plural. The processor 120 of the electronic device 101 may determine whether the feeding for the antenna array 505 is performed with a single polarity or a plurality of polarities. The processor 120 may determine whether a polarity of a signal applied to the antenna array 505 is of a single polarity such as horizontal polarization feeding or vertical polarization feeding or of a plurality of polarities such as horizontal-vertical dual polarization feeding. According to one embodiment, the processor 120 may identify feeding using a single polarity or feeding using a plurality of polarities using information (e.g., a beam identifier) of a beam used in the antenna array 505. For example, the processor 120 may determine whether feeding is performed in a single direction or in a plurality of directions using the intensity of a beam-formed beam, the form of the beam, and/or the polarization direction of the beam. As another example, the processor 120 may determine whether feeding is performed in a single direction or a plurality of directions by determining which of a plurality of terminals provided in the first direction D1 and the second direction D2 is fed or which all the plurality of terminals are fed with respect to each of the first to fourth elements 510, 520, 530, and 540 constituting the antenna array 505.

In operation 703, the electronic device 101 according to an embodiment may identify the magnitude of a first backoff value. The processor 120 may allow the modem 501 to identify the first backoff value. The power density (PD) of frequencies in a specific range may be used to represent an exposure intensity of electromagnetic waves. The power density may be defined as power per unit area. For example, the power density may generally be expressed in watts per square meter ($W/m^2$), milliwatts per square centimeter ($mW/cm^2$), or microwatts per square centimeter ($\mu W/cm^2$). The modem 501 may generate a power backoff event when a power density higher than a reference power density that satisfies criteria for the maximum permissible exposure value for electromagnetic waves and/or a specific absorption rate is generated in a case in which all of the first to fourth elements 510, 520, 530, and 540 operate. The modem 501 may reduce feed power by the first backoff value when the power backoff event occurs.

In operation 705, the electronic device 101 according to an embodiment may identify the number of elements that transmit and/or receive signals. The processor 120 may identify the number of elements performing beamforming among the plurality of elements 510, 520, 530, and 540. For example, the processor 120 may identify the number of elements performing beamforming by analyzing the intensity, form, and/or phase of the beam. As another example, the processor 120 may identify the number of elements which are activated into an operation state based on a state of an established communication channel, a communication environment with a base station, and/or a power state of the electronic device 101.

According to one embodiment, a first backoff value may belong to any one of a plurality of ranges according to whether a power backoff event is required for each of elements performing beamforming. For example, the first backoff value may belong to any one of three ranges based on a first threshold value and a second threshold value greater than the first threshold value. Specifically, when the first backoff value is less than or equal to the first threshold, the first backoff value may belong to a first range, when the first backoff value exceeds the first threshold value or less than the second threshold value, the first backoff value may belong to a second range, and when the first backoff value exceeds the second threshold value, the first backoff value may belong to a third range.

According to one embodiment, the first threshold value and the second threshold value may be values that are references based on which whether the power backoff event is required and is changed when the number of elements performing beamforming changes. For example, the first threshold value may be about 6 dB and the second threshold may be about 12 dB. In this case, when the first backoff value is 4 dB, the first backoff value may be in the first range, when the first back off value is 8 dB, the first backoff value may be in the second range, and when the first back off value is 14 dB, the first backoff value may be in the third range.

In operation 707, the electronic device 101 according to an embodiment may set a second backoff value and perform a backoff operation. The processor 120 may generate a second backoff value by adjusting a first backoff value stored in the memory 130 based on the feed polarity of the antenna array 505 and the number of elements performing beamforming and perform power backoff according to the second backoff value. The second backoff value may be an amount of input power that is to be reduced to satisfy the reference power density when a power backoff event occurs. The second backoff value may have a magnitude by which the processor 120 reduces power transferred to the first to fourth elements 510, 520, 530, and 540 included in the antenna array 505.

According to one embodiment, before setting the second backoff value, the first backoff value may be adjusted based on the number of polarities of signals transferred to the antenna array 505. As the number of polarities of the signals transferred to the antenna array 505 decreases, the first backoff value may decrease. For example, the first backoff value may be reduced by about 3 dB when the antenna array 505 is subjected to horizontal-vertical dual feeding compared to a case when the antenna array 505 is fed with a single polarity. When the antenna array 505 is subjected to the horizontal-vertical dual feeding, the EIRP of the antenna array 505 may increase by about 3 dB compared to a case when the antenna array 505 is fed with a single polarity. Accordingly, in the case of horizontal-vertical dual feeding, the reference power density may increase by about 3 dB than in the case a case when the antenna array 505 is fed with a single polarity, and therefore, even though the first backoff value is reduced by 3 dB compared to the case when the antenna array 505 is fed with a single polarity, it is possible to satisfy the reference power density.

In one embodiment, the second backoff value may decrease as the number of elements performing beamforming decreases. For example, when the number of elements performing beamforming is reduced by half, the EIRP may decrease by about 3 dB in the patch array and by about 3 dB in the array antenna, resulting in reduction by about 6 dB. Accordingly, when the number of elements performing beamforming is reduced by half, power backoff may be performed with reduction by about 6 dB. When the number of elements performing beamforming is reduced by half, the second backoff value may be set to a value about 6 dB smaller than the first backoff value.

In one embodiment, the second backoff value may be set according to the number of elements performing beamforming and the range of the first backoff value. For example, when the number of elements performing beamforming is a first number, the second backoff value may be the same value as the first backoff value. This is because the first number is the number of elements when the first backoff value is set. As another example, in a case in which the first backoff value is in the first range, when the number of elements performing beamforming is a second number and a third number, the second backoff value may be set to zero. In this case, the power backoff operation may not be performed. As another example, in a case in which the first backoff value is the second range or the third range, when the number of elements performing beamforming is the second number, the second backoff value may be a value obtained by subtracting 6 dB from the first backoff value.

Figure 7B:
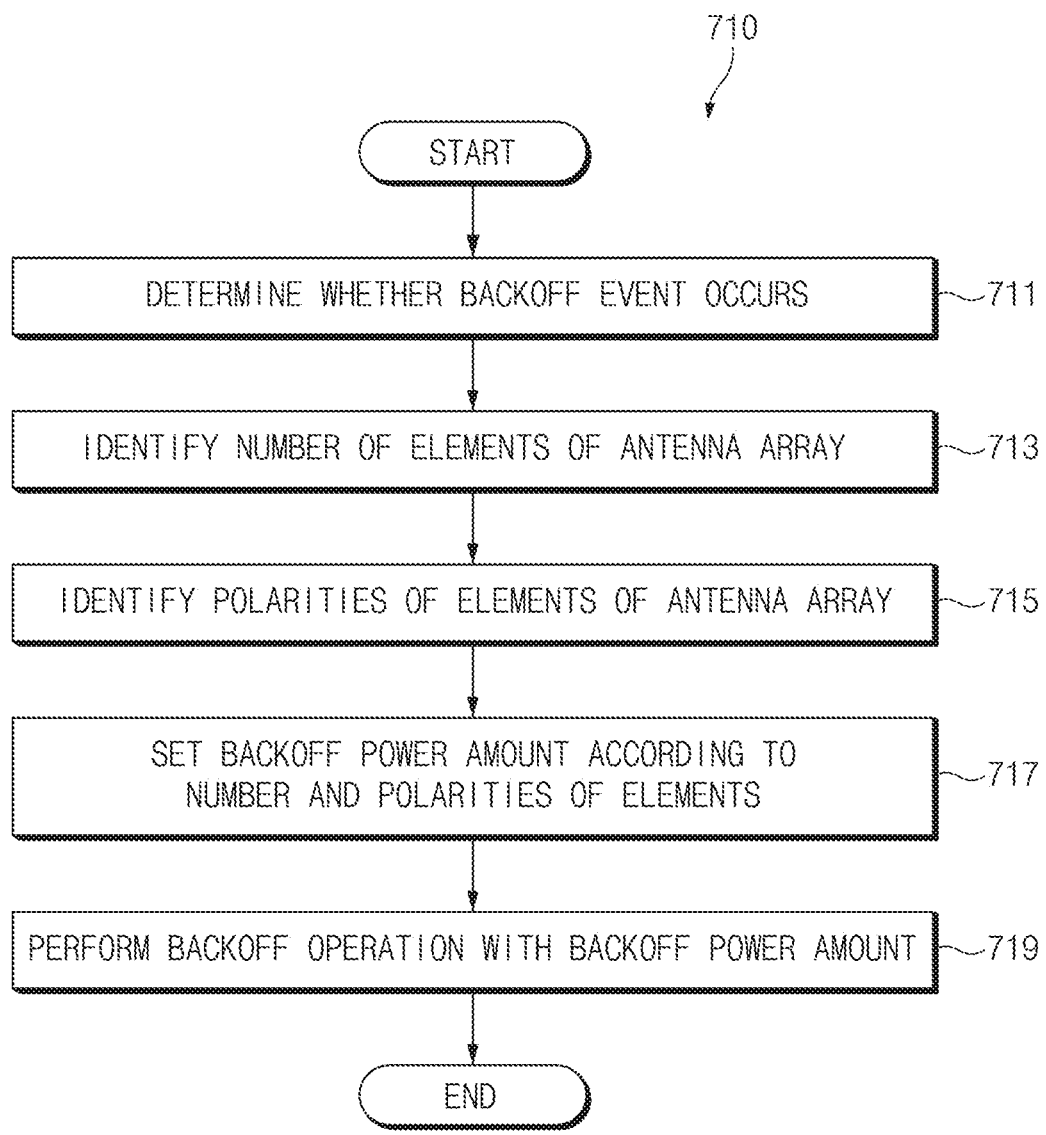
FIG. 7B is a flowchart illustrating a power backoff control method of an electronic device according to an embodiment of the disclosure.

FIG. 7B is a flowchart illustrating a power backoff control method of an electronic device according to an embodiment of the disclosure.

Referring to FIG. 7B, a flowchart 710 of another power backoff method is illustrated. In operation 711, the electronic device 101 according to an embodiment may determine whether a backoff event occurs. For example, the processor 120 may determine a case of capable of setting or changing the backoff value when there occurs an event in which a human body is proximate to the electronic device 101 such as a user grips the electronic device 101. As another example, the processor 120 may determine a case of capable of setting or changing the backoff value when there occurs an event in which a communication environment, a beamforming state, or a signal transmission and/or reception state of the electronic device 101 changes.

In operation 713, the electronic device 101 according to an embodiment may identify the number of elements that transmit and/or receive a signal. The processor 120 may identify the number of elements performing beamforming among the first to fourth elements 510, 520, 530, and 540. One element 510 may include one patch antenna 332 as shown in FIG. 3A, or may include the dipole antenna 332a and the patch antenna 332b that generate signals having different polarities as shown in FIG. 3B. In addition, there may be a variety of antenna geometries to create horizontally and/or vertically polarized polarities.

In operation 715, the electronic device 101 according to an embodiment may identify a polarity of a signal transferred to an element that transmits and/or receives a signal. The processor 120 may determine whether the polarity of the signal to be transferred is a single polarity or a plurality of polarities. For example, the processor 120 may determine whether the signal transferred to the element is a single horizontal polarity, a single vertical polarity, or a horizontal-vertical dual polarity.

In operation 717, the electronic device 101 according to an embodiment may set a backoff power amount based on the number and the polarities of activated elements. The processor 120 may calculate a reduction amount of the first backoff value based on the number and polarities of the activated elements.

In operation 719, the electronic device 101 according to an embodiment may determine a backoff power value and perform a power backoff operation according to the backoff power value.

Figure 8:
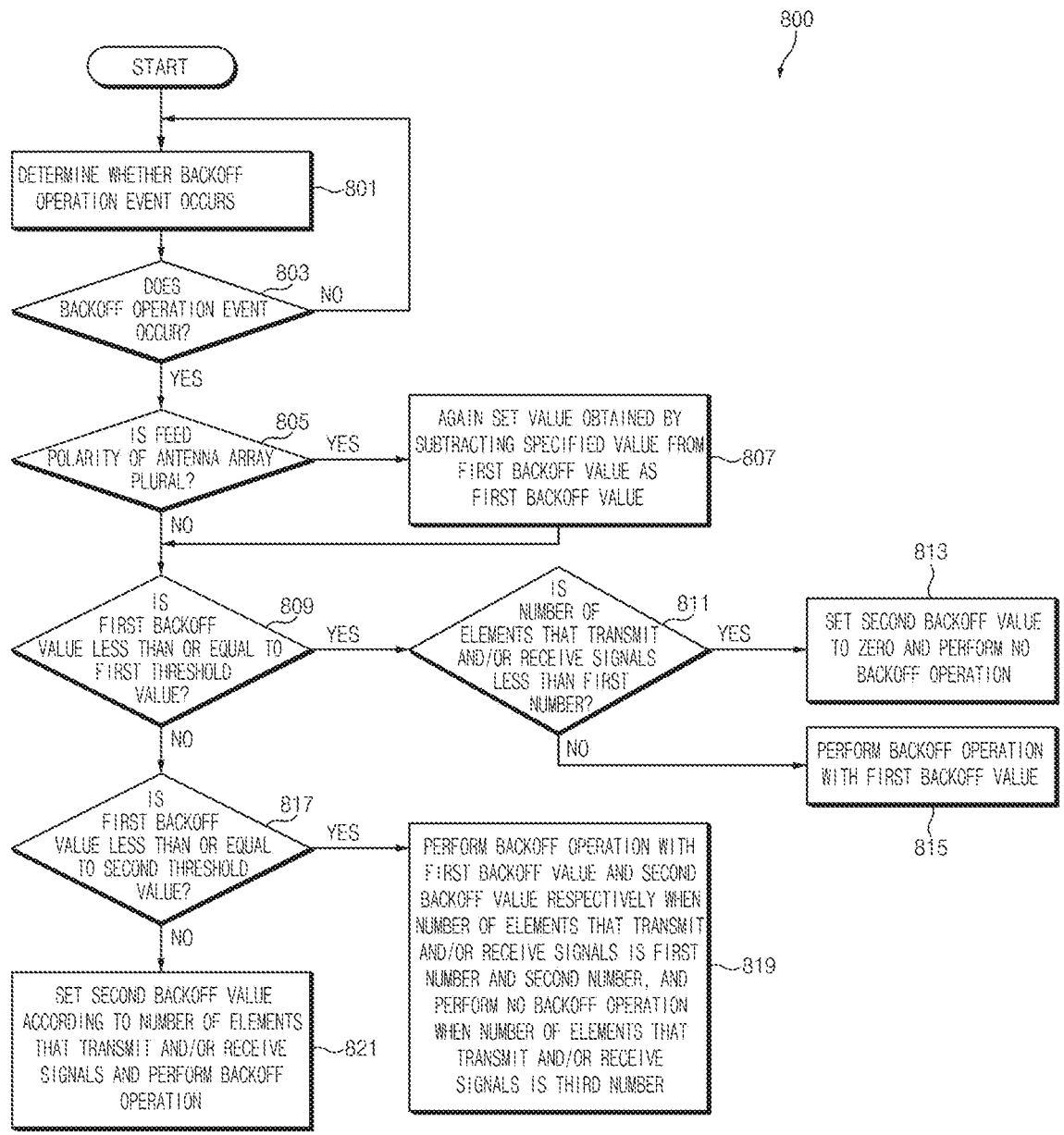
FIG. 8 is a flowchart illustrating a power backoff control method of an electronic device according to an embodiment of the disclosure.

FIG. 8 is a flowchart 800 illustrating a power backoff control method of the electronic device 101 according to an embodiment of the disclosure.

In operation 801, the electronic device 101 may detect whether a backoff operation event occurs. The processor 120 may detect whether a power backoff event has occurred. For example, the processor 120 may measure a power density of the electronic device 101.

In operation 803, the electronic device 101 according to an embodiment may determine whether a backoff operation event has occurred. For example, the processor 120 may determine that a power backoff event has occurred when the proximity of a human body or a change in a communication state occurs as described above. The processor 120 may proceed to operation 805 when a power backoff event occurs (operation 803—Yes). When the power backoff event occurs, the power backoff amount by which the first backoff value is adjusted may be changed according to the condition of an operation event. For example, the power backoff amount may vary depending on a condition such as a hot spot or a user's grip. When the power backoff event does not occur (operation 803—No), the processor 120 may return to operation 801 while performing feeding with an original magnitude without performing the power backoff.

In operation 805, the electronic device 101 according to an embodiment may determine whether the feed polarity of the antenna array is plural. The processor 120 may determine whether the feeding for the antenna array 505 is performed with a single polarity or a plurality of polarities. The processor 120 may determine whether the first to fourth elements 510, 520, 530, and 540 included in the antenna array 505 are fed in a single direction such as horizontal feeding or vertical feeding or is subjected to horizontal-vertical dual feeding. The processor 120 may proceed to operation 807 when at least one of the first to fourth elements 510, 520, 530, and 540 is subjected to horizontal-vertical dual feeding (operation 805—Yes). The processor 120 may proceed to operation 809 when all of the first to fourth elements 510, 520, 530, and 540 are fed in a single direction (operation 805—No).

In operation 807, the electronic device 101 according to an embodiment may again set a value obtained by subtracting a specified value from the first backoff value to the first backoff value. The processor 120 may reduce the first backoff value by a specified size. When the first to fourth elements 510, 520, 530, and 540 are fed with horizontally-vertical dual feeding, the reference power density may increase by about 3 dB compared to a case in which feeding is performed in a single direction. The processor 120 and/or the second communication processor 214 may perform setting such that the first backoff value is reduced by about 3 dB when the first to fourth elements 510, 520, 530, and 540 are fed with a horizontal-vertical dual feeding.

In operation 809, the electronic device 101 according to an embodiment may determine whether the first backoff value is less than or equal to the first threshold value. The first backoff value may be a value for collectively reducing signals transferred when the number of elements operating when the power backoff event is performed is the maximum. The first threshold value may be a threshold value corresponding to a case in which it is not necessary to perform a power backoff operation when the second or third number of elements perform beamforming and it is necessary to perform a power backoff operation only when the first number of elements perform beamforming. For example, the first threshold value may be about 6 dB. The processor 120 may proceed to operation 811 when the first backoff value is less than or equal to the first threshold value (operation 809—Yes). The processor 120 may proceed to operation 817 when the first backoff value exceeds the first threshold value (operation 809—No).

In operation 811, the electronic device 101 according to an embodiment may determine whether the number of elements that transmit and/or receive signals is less than or equal to the first number. The processor 120 may identify the number of elements performing beamforming in consideration of the magnitude, form and/or phase of a beam, or in consideration of the feeding type of the first to fourth elements 510, 520, 530, and 540. The processor 120 may proceed to operation 813 when the number of elements performing beamforming is a second number or a third number that is less than the first number (operation 811—Yes). The processor 120 may proceed to operation 815 when the number of elements performing beamforming is the first number (operation 811—No).

In operation 813, the electronic device 101 according to an embodiment may set the second backoff value to zero and may not perform a backoff operation. For example, when the number of elements performing beamforming is one or two, the processor 120 may not need to perform a power backoff operation because the power density does not exceed the reference power density. The processor 120 may perform feeding in a state in which an unnecessary power backoff operation is not performed.

In operation 815, the electronic device 101 according to an embodiment may perform a backoff operation with the first backoff value. The processor 120 may set the second backoff value to the same value as the first backoff value. When the number of elements performing beamforming is four, the processor 120 may set the second backoff value to the same value as the first backoff value because the processor 120 has set the first backoff value based on the case in which the number of elements performing beamforming is four.

In operation 817, the electronic device according to an embodiment may determine whether the first backoff value is less than or equal to the second threshold value. The second threshold value may be a threshold value corresponding to a case in which it is necessary to perform a power backoff operation when the first or second number of elements perform beamforming and it is not necessary to perform a power backoff operation only when the third number of elements perform beamforming. For example, the second threshold value may be about 12 dB. The processor 120 may proceed to operation 819 when the first backoff value is less than or equal to the second threshold value (operation 817—Yes). The processor 120 may proceed to operation 821 when the first backoff value exceeds the second threshold value (operation 817—No).

In operation 819, the electronic device 101 may perform the backoff operation with the first backoff value and the second backoff value respectively when the number of elements that transmit and/or receive signals is the first number and the second number, and may not perform the backoff operation when the number of elements that transmit and/or receive signals is the third number. When the number of elements that transmit and/or receive signals is the first number, the processor 120 may set the second backoff value to the same value as the first backoff value which is set based on the first number to perform the backoff operation. When the number of elements that transmit and/or receive signals is the second number, the processor 120 may perform a backoff operation with the second backoff value which is less than the first backoff value. For example, when the second number is half of the first number, the processor 120 may set the second backoff value to a value about 6 dB less than the first backoff value and perform the backoff operation based on the second backoff value. When the number of elements that transmit and/or receive signals is the third number, the processor 120 may set the second backoff value to zero and perform feeding in a state in which the backoff operation is not performed.

In operation 821, the electronic device 101 according to an embodiment may set the second backoff value according to the number of elements that transmit and/or receive signals and perform a backoff operation. When the number of elements that transmit and/or receive signals is the first number, the processor 120 may set the second backoff value to the same value as the first backoff value which is set based on the first number to perform the backoff operation. When the number of elements that transmit and/or receive signals is the second number, the processor 120 may set the second backoff value to a value about 6 dB less than the first backoff value and then perform the backoff operation based on the second backoff value. When the number of elements that transmit and/or receive signals is the third number, the processor 120 may set the second backoff value to a value about 12 dB less than the first backoff value and then perform the backoff operation based on the second backoff value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments disclosed herein, it is possible to adjust the degree of the power backoff according to whether the feed polarity of an antenna array is plural or singular by controlling the power backoff value depending on whether the feed polarity of the antenna array for generating a horizontally polarized electric field and/or a vertically polarized electric field is plural or singular.

According to the embodiments disclosed herein, it is possible to adjust the degree of the power backoff according to whether the number of elements included in the antenna array is plural or singular by controlling the power backoff value depending on whether the number of elements included in the antenna array is plural or singular.

In addition, according to the embodiments disclosed herein, it is possible to again set a power backoff value according to the number of operating elements to prevent the EIRP from being reduced more than necessary and improve the radiation performance of the antenna array.

In addition, various effects may be provided that are directly or indirectly understood through the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an antenna array including a plurality of elements arranged to perform beamforming, wherein a first number corresponds to a total number of the plurality of elements;
a processor operatively connected to the antenna array; and
a memory,
wherein the memory stores instructions that, when executed, cause the processor to:
identify a second number of the plurality of elements that are receiving power to perform the beamforming and a third number of the plurality of elements that are not receiving power to perform the beamforming, the second number being less than the first number,
determine a first backoff value stored based on the second number, and
perform a power backoff operation according to the first backoff value.

2. The electronic device of claim 1,
wherein a default backoff value satisfies a criteria for a Specific Absorption Rate (SAR), the SAR indicating a maximum permissible exposure (MPE) value of electromagnetic waves used for wireless communication and/or an electromagnetic wave absorption rate to a human body when the plurality of elements are receiving power to perform the beamforming,
wherein the first backoff value is less than the default backoff value, and
wherein the first backoff value is determined based on at least one of a backoff table stored in the memory, a state of the electronic device, or a communication environment established by a communication processor.

3. The electronic device of claim 1,
wherein the memory stores instructions that, when executed, further cause the processor to, before the second number is identified, determine whether the antenna array is fed with a single polarity or a plurality of polarities,
wherein the plurality of polarities comprises horizontal-vertical dual polarization,
wherein the first backoff value corresponds to a first value when the antenna array is fed with the single polarity and a second value when the antenna array is fed with the horizontal-vertical dual polarization, the first value being less than the second value.

4. The electronic device of claim 1, wherein the memory stores instructions that, when executed, further cause the processor to reduce the first backoff value as the second number of the plurality of elements that are performing the beamforming decreases.

5. The electronic device of claim 1, wherein the memory stores instructions that, when executed, further cause the processor to:
generate a second backoff value by adjusting the first backoff value based on the second number.

6. The electronic device of claim 5, wherein, the memory stores instructions that, when executed, further causes the processor to:
determine whether the second number is half of the first number,
in case the second number is half of the first number and the second backoff value is less than or equal to a first threshold value, set the second backoff value to zero to perform no power backoff, and
in case the second number is half of the first number and the first backoff value exceeds the first threshold value, set the second backoff value to a value obtained by reducing the first backoff value by the first threshold value.

7. The electronic device of claim 5, wherein the memory stores instructions that, when executed, further cause the processor to:
determine whether the second number is equal to a minimum number of the plurality of elements,
in case that the second number is equal to the minimum number and the second backoff value is less than or equal to a second threshold value greater than a first threshold value, set the second backoff value to zero to perform no power backoff, and
in case that the second number is equal to the minimum number and the second backoff value exceeds the second threshold value, set the second backoff value to a value obtained by reducing the first backoff value by the first threshold value.

8. The electronic device of claim 1, wherein the memory stores instructions that, when executed, further cause the processor to change the first backoff value in real time when the second number of the plurality of elements that are performing the beamforming changes.

9. A method of controlling power backoff in an electronic device, the method comprising:
identifying a second number of elements from a plurality of elements in an antenna array that are receiving power to perform beamforming and a third number of the plurality of elements that are not receiving power to perform the beamforming, the second number being less than a total number of the plurality of elements, wherein a first number corresponds to a total number of the plurality of elements;
determining a first backoff value stored based on a feed polarity of the antenna array and the second number; and
performing a power backoff operation according to the first backoff value.

10. The method of claim 9,
wherein a default backoff value satisfies a criteria for a Specific Absorption Rate (SAR), the SAR indicating a maximum permissible exposure (MPE) value of electromagnetic waves used for wireless communication and/or an electromagnetic wave absorption rate to a human body when the plurality of elements are receiving power to perform the beamforming,
wherein the first backoff value is less than the default backoff value, and
wherein the first backoff value is determined based on at least one of a backoff table stored in a memory of the electronic device, a state of the electronic device, or a communication environment established by a processor of the electronic device.

11. The method of claim 9, further comprising:
before the second number is identified, determining whether the antenna array is fed with a single polarity or a plurality of polarities, and
wherein the plurality of polarities comprises horizontal-vertical dual polarization, and
wherein the first backoff value corresponds to a first value when the antenna array is fed with the single polarity and a second value when the antenna array is fed with the horizontal-vertical dual polarization, the first value being less than the second value.

12. The method of claim 9, further comprising:
reducing the first backoff value as the second number of elements that are performing the beamforming decreases.

13. The method of claim 9, further comprising:
generating a second backoff value by adjusting the first backoff value based on the second number.

14. The method of claim 13, further comprising:
determine whether the second number is half of the first number,
in case the second number is half of the first number and the second backoff value is less than or equal to a first threshold value, setting the second backoff value to zero to perform no power backoff; and
in case the second number is half of the first number and the first backoff value exceeds the first threshold value, setting the second backoff value to a value obtained by reducing the first backoff value by the first threshold value.

15. The method of claim 13, further comprising:
determine whether the second number is equal to a minimum number of the plurality of elements,
in case that the second number is equal to the minimum number and the second backoff value is less than or equal to a second threshold value greater than a first threshold value, setting the second backoff value to zero to perform no power backoff; and
in case that the second number is equal to the minimum number and the second backoff value exceeds the second threshold value, setting the second backoff value to a value obtained by reducing the first backoff value by the first threshold value.

16. A non-transitory computer-readable storage medium configured to store one or more computer programs including instructions that, when executed by a processor, cause the processor to control to:
identify a second number of elements from a plurality of elements in an antenna array that are receiving power to perform beamforming and a third number of the plurality of elements that are not receiving power to perform the beamforming, the second number being less than a total number of the plurality of elements, wherein a first number corresponds to a total number of the plurality of elements;
determine a first backoff value based on a feed polarity of the antenna array and the second number; and perform a power backoff operation according to the first backoff value.

17. The non-transitory computer-readable storage medium of claim 16,
wherein the instructions further cause the processor to, before the second number is identified, control to determine whether the antenna array is fed with a single polarity or a plurality of polarities,
wherein the plurality of polarities comprises horizontal-vertical dual polarization, and
wherein the first backoff value corresponds to a first value when the antenna array is fed with the single polarity and a second value when the antenna array is fed with the horizontal-vertical dual polarization, the first value being less than the second value.

18. The non-transitory computer-readable storage medium of claim 16, wherein the instructions further cause the processor to control to perform the power backoff operation while maintaining the first backoff value when the second number is equal to the first number.

19. The non-transitory computer-readable storage medium of claim 18, wherein the instructions further cause the processor to control to:
determine whether the second number is half of the first number;
in case the second number is half of the first number and a second backoff value is less than or equal to a first threshold value, set the second backoff value to zero to perform no power backoff; and
in case the second number is half of the first number and the first backoff value exceeds the first threshold value, set the first backoff value to a value obtained by reducing the first backoff value by the first threshold value.

20. The non-transitory computer-readable storage medium of claim 18, wherein the instructions further cause the processor to control to:
determine whether the second number is equal to a minimum number of the plurality of elements;
in case that the second number is equal to the minimum number and the second backoff value is less than or equal to a second threshold value greater than a first threshold value, set the first backoff value to zero to perform no power backoff; and
in case that the second number is equal to the minimum number and the second backoff value exceeds the second threshold value, set the second backoff value to a value obtained by reducing the first backoff value by the second threshold value.

21. The non-transitory computer-readable storage medium of claim 16, wherein the instructions further cause the processor to control to:
determine whether a user is proximate to an electronic device based on data received from a sensor; and
perform the power backoff operation in case that the user is proximate to the electronic device.

22. The non-transitory computer-readable storage medium of claim 21, wherein the second number of elements are selected to perform the beamforming based on at least one of a communication channel state, a communication environment with a base station, or a power state of a battery that provides power to the processor.

23. The non-transitory computer-readable storage medium of claim 21, wherein each element of the plurality of elements comprises:
a dipole antenna configure to radiate in a first direction, and
a patch antenna configured to operate in a second direction that is perpendicular to the first direction.

* * * * *